US006273820B1

(12) United States Patent
Haste, III

(10) Patent No.: US 6,273,820 B1
(45) Date of Patent: Aug. 14, 2001

(54) VIRTUAL PLAYER GAMING METHOD

(76) Inventor: Thomas E. Haste, III, 11288 Ventura Blvd., Suite 734, Studio City, CA (US) 91604

(*) Notice: Subject to any disclaimer, the term of this patent is extended or adjusted under 35 U.S.C. 154(b) by 0 days.

(21) Appl. No.: 09/338,004

(22) Filed: Jun. 22, 1999

Related U.S. Application Data

(60) Provisional application No. 60/118,609, filed on Feb. 4, 1999.

(51) Int. Cl.[7] ..................... A63F 13/00

(52) U.S. Cl. ..................... 463/40; 463/20; 273/143 R

(58) Field of Search ..................... 463/20, 25, 40; 273/138.1, 143 R

(56) References Cited

U.S. PATENT DOCUMENTS 3,704,890 * 12/1972 Zucker et al. .................. 273/143 R
4,467,424 8/1984 Hedges et al. .
5,342,047 * 8/1994 Heidel et al. .................. 273/85 CP
5,762,552 6/1998 Vuong et al. .
5,830,067 11/1998 Graves et al. .
6,012,983 * 1/2000 Walker et al. .................. 463/20
6,024,643 * 2/2000 Begis .................. 463/42

* cited by examiner

*Primary Examiner*—Joe H. Cheng
*Assistant Examiner*—Kathleen M. Christman
(74) *Attorney, Agent, or Firm*—Blakely, Sokoloff, Taylor & Zafman LLP

(57) ABSTRACT

Software running on a central server provides a virtual casino environment in which a plurality of virtual players continuously play various games such as poker, slots, black jack, etc. Each virtual player is given an initial gaming stake from which wagers are placed in the virtual gaming environment. A gaming patron participates by purchasing or "sponsoring" a virtual player. Although the gaming patron may select a virtual player that is playing a particular type of game, the patron cannot otherwise control the play of the game. A gaming terminal is coupled to the central server at which the gaming patron can monitor the virtual player. Although the gaming patron is essentially a passive observer, the experience is very similar to that of the patron actually playing the game.

10 Claims, 2 Drawing Sheets

VIRTUAL PLAYER GAMING METHOD

RELATED APPLICATION

This application claims the benefit of abandoned provisional application Ser. No. 60/118,609 filed Feb. 4, 1999.

BACKGROUND OF THE INVENTION

1. Field of the Invention

The present invention relates generally to the field of gaming. More specifically, the invention pertains to a gaming method by which a gaming patron employs one or more virtual players to participate on his or her behalf in a game of chance.

2. Background

Games of chance are a popular pastime in this country. However, gambling is widely outlawed and, where lawful, gambling is heavily regulated. One of the most popular forms of gambling employs electronic gaming devices such as slot machines and the like. Such devices are classified according to the manner in which the gaming outcome is determined. Some jurisdictions permit only certain classes of gaming devices. Naturally, gaming patrons prefer the excitement of "pure" gambling. Thus, gaming devices of all classes attempt to emulate a "pure" gambling experience to the maximum extent permissible under the appropriate regulations. Examples of such devices are disclosed in this inventor's prior issued U.S. Pat. Nos. 5,580,311 and 5,595,538.

Regardless of the type of game or device involved, some gaming patrons have a desire to continue the play of a game even if the patron cannot be physically present and/or to participate in a plurality of games simultaneously. Sometimes, it is possible to participate by proxy in a gaming activity. Such proxy play is commonly used, for example, in bingo games. U.S. Pat. No. 5,830,067 issued to Graves, et al. discloses an electronic gaming device that acts as a proxy player. The device enables individuals to participate in games of chance, such as bingo or other types of games, even though they may be outside of the jurisdiction where such games are permitted.

SUMMARY OF THE INVENTION

The present invention provides a gaming system that operates on a central server. Software running on the central server provides a virtual casino environment in which a plurality of virtual players continuously play various games such as poker, slots, black jack, etc. Each virtual player is given an initial gaming stake from which wagers are placed in the virtual gaming environment. A gaming patron participates by purchasing or "sponsoring" a virtual player. Although the gaming patron may select a virtual player that is playing a particular type of game, the patron cannot otherwise control the play of the game.

A gaming terminal is coupled to the central server at which the gaming patron can monitor the virtual player. Although the gaming patron is essentially a passive observer, the experience is very similar to that of the patron actually playing the game. The patron can choose to "cash out" at any point in time, but cannot otherwise control the virtual player. Whether or not the virtual player is monitored by the gaming patron, the virtual player will continue to play until either the initial stake is exhausted or the gaming patron elects to cash out. Optionally, the gaming patron may elect to suspend play of the virtual game for some period of time.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
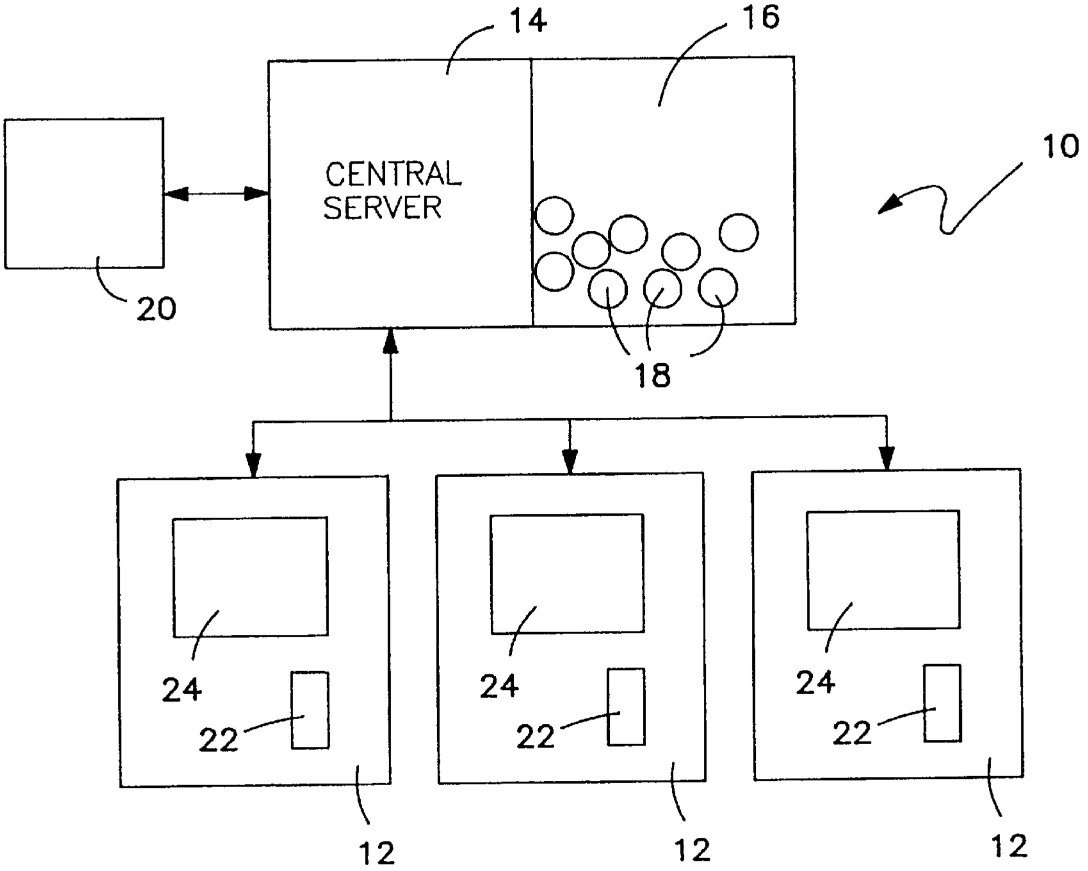
FIG. 1 is a functional block diagram of a gaming system in accordance with the present invention.

FIG. 1 generally illustrates the gaming system 10 of the present invention. A plurality of gaming terminals 12 are coupled to a central server 14. Server 14 may be located in the same establishment as terminals 12 or may be remotely located and coupled to terminals 12 by a telecommunications network. Software operating on server 14 provides a virtual casino environment 16 having a plurality of virtual players 18. In order to participate in a virtual game, a gaming patron (i.e., a real person) purchases a virtual player at terminal 20. This may be an automated terminal or may be operated by an employee of the establishment in which gaming system 10 is installed. The gaming patron is issued an identification card which is encoded with information identifying the virtual player(s) that the patron has purchased. Each of gaming terminals 12 includes a card reader 22. In order to monitor the play of a purchased virtual player, the gaming patron inserts the identification card into one of the gaming terminals. Optionally, the gaming patron may also be required to input a personal security code. A display screen 24 presents the gaming patron with a display of the game being played by the virtual player. The display is substantially the same as would be presented to a real player of the same type of game in a real casino. Although the gaming patron is essentially a passive observer of the virtual player, the experience is very similar to that of the patron actually playing the game in a real casino. Since the virtual casino environment is wholly within central server 14 and gaming terminals 12 are merely "windows" into that environment, terminals 12 are not considered to be gaming devices.

Figure 2:
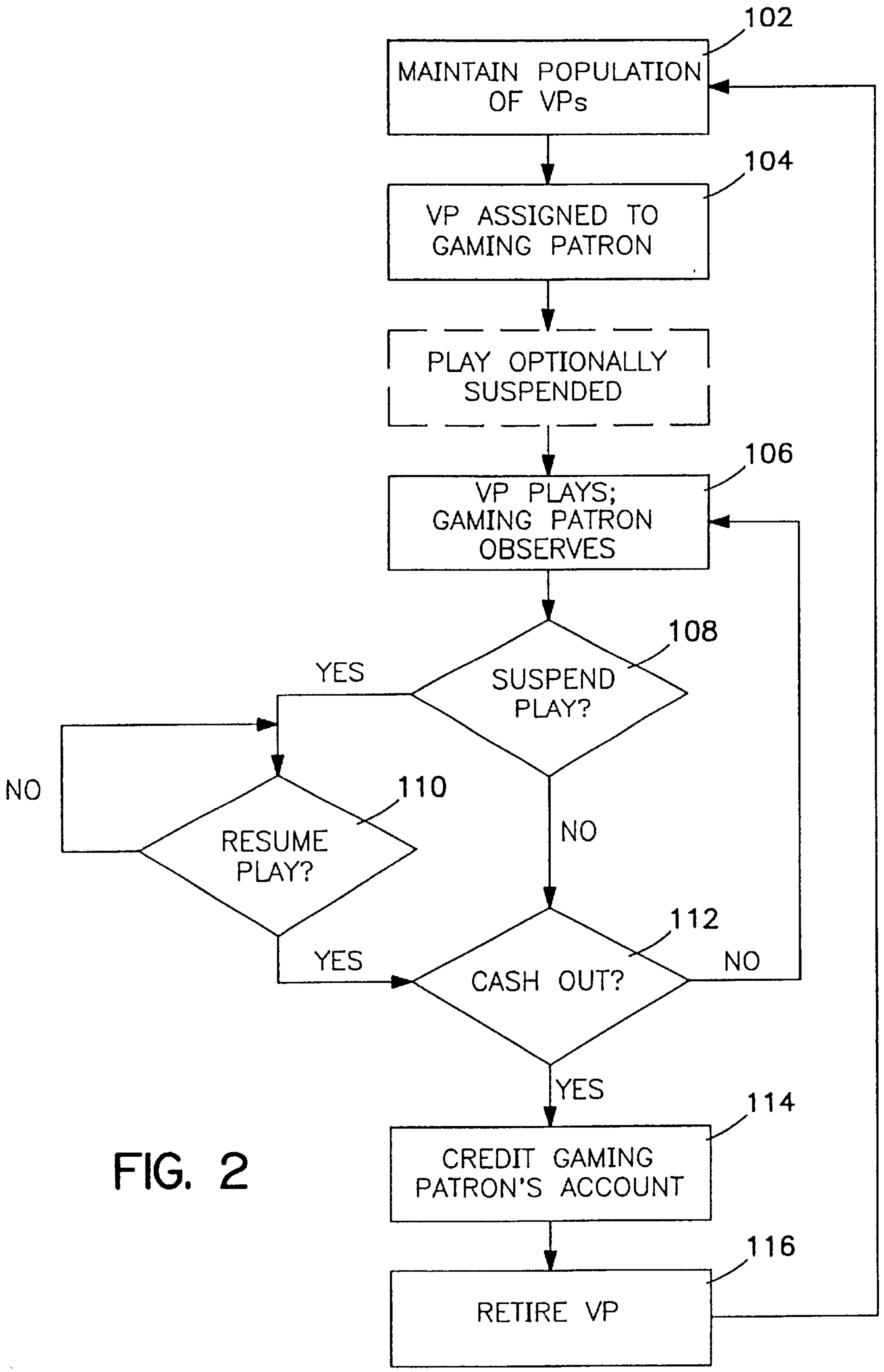
FIG. 2 is a functional flow diagram of the gaming method of the present invention.

Referring now to FIG. 2, the operation of gaming system 10 will be further described. Beginning at step 102 the central server maintains a population of virtual players. The system can maintain players for any number of desired games, such as poker, slots, black jack, etc. Each of the virtual players plays a particular game just as if it was a real player in a real casino. Each virtual player is given an initial gaming stake denominated in dollars that is used by the virtual player to play the virtual game. Wagers are placed by the virtual player and, as with a real player, the virtual player can either win or lose the wager. The virtual player's account is credited or debited accordingly. The odds of winning or losing are the same for all virtual players playing a particular game, whether or not they have been purchased by gaming patrons. If a virtual player's account goes to zero, the virtual player may be deleted from the system or simply ignored and placed in a "losers" pool. In either case, another virtual player may be automatically created. Depending upon applicable gaming regulations, there may be a limited number or maximum number of virtual players that may be created during any particular period of time.

In addition to the normal return on a wager, a virtual player may also win prizes or bonus jackpots that are frequently available to real players in a real casino. For example, a virtual game may award a virtual player with a car, a cruise, a progressive jackpot, etc. The total winnings, both cash and prizes, of virtual players may be purely random or may be selected from a predetermined pool of winners and losers. The particular way in which winnings are allocated to virtual players will be determined by the applicable gaming regulations.

A gaming patron selects a virtual player at step 104. In making the selection, the patron may specify the particular type of game to be played, and a virtual player will be selected from among only those playing the desired game. The patron is charged an amount that may be equal to the initial gaming stake of the virtual player. There may be virtual players with initial stakes of differing amounts, in which case the patron would be offered a choice of purchase prices for virtual players. The particular virtual player that the patron receives could be random or sequential from the population of available virtual players. The patron would not have the opportunity to view the progress of a virtual player prior to selection. Furthermore, apart from the particular game that the virtual player is playing and the size of the virtual player's stake, the patron would have no control over which virtual player is selected. Once the selection is made, the patron reaps the winnings or suffers the losses of the virtual player. In a sense, the gaming patron is the sponsor of the virtual player. The only control that the patron has over the virtual player is the decision of when to cash out and collect the winnings, if any. The patron cannot affect the play of the virtual game in any way. In a variation of the invention, however, a manual mode of operation may be provided in which the gaming patron can, if desired, actually control the play of the game. Control could later be passed back to the virtual player at the gaming patron's option. This variation of the invention would only be available in physical casino environments that permit "class 3" gaming machines.

Once a patron has received a virtual player, the patron may monitor the virtual player at step 106. As explained above, the patron receives an identification card when the virtual player is purchased and inserts the identification card in a gaming terminal in order to view the virtual game being played by the assigned virtual player. Since the virtual players are continuously playing their respective virtual games, it is possible for a patron to purchase a virtual player that has already won a substantial amount of cash and/or prizes. The gaming patron could, if desired, immediately cash out and receive the winnings. Alternatively, a virtual player may already have suffered substantial losses when purchased by the gaming patron. Optionally, in order to avoid a virtual player losing all of its initial gaming stake before the gaming patron has a chance to sign on at a gaming terminal, a virtual player's playing activity may be stopped when the virtual player is purchased by a patron. Play would then be resumed upon insertion of the identification card in a gaming terminal so that a patron may observe the progress of play. Furthermore, as shown in steps 108 and 110, the patron may optionally be given the ability to suspend virtual play for a period of time, in which case play would be resumed when the identification card is next inserted into a gaming terminal.

The experience of the gaming patron is very similar to the patron actually playing the game in a real casino. Consider, for example, a virtual player playing a slot machine game. Real slot machines have certain winning pay out percentages that cannot be influenced by the player. The only action a player takes is to press a button to start the next "spin" of the slot machine. It is not even necessary to insert a coin if the player has winnings that are stored as credit in the machine. The experience of a gaming patron with the system of the present invention is therefore the same as if the patron was playing a real slot machine in which the "spin" button is automatically pressed after each outcome.

Proceeding to step 112, when the gaming patron is ready to quit his or her "sponsorship" of a virtual player, the patron presses a button or other suitable control on the gaming terminal to "cash out" the virtual player. Preferably, this is a cashless transaction so that there is no need to store cash in the gaming terminals. The gaming patron's account is simply credited with the amount of the winnings at step 114. The patron may then return to the terminal 20 or to a centralized "cash cage" in order to collect the cash value of the winnings. When a virtual player has been cashed out, it is "retired" from the population of virtual players at step 116.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A gaming system comprising:

a central server;

a plurality of gaming terminals coupled to the central server;

a gaming program operating on the central server, said gaming program maintaining a plurality of virtual players individually and repetitively playing a game of chance;

means for assigning one of the plurality of virtual players to a gaming patron;

means for displaying gaming results for said one of the plurality of virtual players on one of the gaming terminals;

means for actuation by the gaming patron to terminate play by said one of the plurality of virtual players and be credited with winnings of said one of the plurality of virtual players.

2. The gaming system of claim 1 wherein the game of chance is one of a plurality of games of chance.

3. The gaming system of claim 1 further comprising a token issued to the gaming patron when said one of the plurality of virtual players is assigned.

4. The gaming system of claim 3 wherein the token is required to activate display of gaming results on said one of the gaming terminals.

5. The gaming system of claim 4 wherein the token comprises an identification card.

6. The gaming system of claim 5 wherein each of the gaming terminals includes a reader for reading the identification card.

7. The gaming system of claim 1 wherein the gaming program controls the virtual players independent of the gaming patron.

8. The gaming system of claim 1 wherein the gaming program controls all outcomes of the game of chance.

9. The gaming system of claim 8 wherein the outcomes of the game of chance are random.

10. The gaming system of claim 8 wherein the outcomes of the game of chance are drawn from a predetermined sequence of outcomes.

* * * * *